United States Patent [19]

Stuart

[11] Patent Number: 4,544,043

[45] Date of Patent: Oct. 1, 1985

[54] ELECTRONIC SCALE WITH COUNTERBALANCE

[75] Inventor: James M. Stuart, Malvern, Pa.

[73] Assignee: Malvern Scale Company, Malvern, Pa.

[21] Appl. No.: 584,412

[22] Filed: Feb. 28, 1984

[51] Int. Cl.$^4$ .................. G01G 1/00; G01G 3/14; G01G 1/28

[52] U.S. Cl. .................. 177/194; 177/210 C; 177/235

[58] Field of Search ........... 177/176, 187, 194, 210 R, 177/210 C, 210 EM, 210 FP, 235, 184

[56] References Cited

U.S. PATENT DOCUMENTS

| | | | |
|---|---|---|---|
| 3,658,143 | 4/1972 | Schwartz | 177/187 X |
| 3,773,124 | 11/1973 | Bullivant | 177/210 EM |
| 3,987,861 | 10/1976 | Smith | 177/235 X |
| 4,153,124 | 5/1979 | Knothe et al. | 177/210 EM |
| 4,372,405 | 2/1983 | Stuart | 177/210 C X |
| 4,458,770 | 7/1984 | Bucci | 177/210 C |

FOREIGN PATENT DOCUMENTS 3221062 12/1983 Fed. Rep. of Germany ...... 177/184
7711356 4/1979 Netherlands ........................ 177/187

OTHER PUBLICATIONS

The Condensed Chemical Dictionary, Van Nostrand Reinhold Co., Ninth Ed., p. 393.

Primary Examiner—E. A. Goldberg
Assistant Examiner—Patrick W. Foster
Attorney, Agent, or Firm—Caesar, Rivise, Bernstein & Cohen

[57] ABSTRACT

An electronic scale used for weighing an object or material. The scale includes a weighing platform arranged to move upon receipt of a material thereon. The device further includes support means, a variable capacitor having a first and a second plate, spring means which is coupled both to the frame means and to the platform means such that movement of the platform means upon receipt of the material thereon causes the spring means to twist about an axis. The scale further includes counterbalancing means and energy absorbing connecting means to prevent error from being introduced into the weighing process, should vibrational moments be transmitted to the scale from its external environment. An alternative embodiment of the invention entails a flexure base scale, adapted to be used with counterbalancing means.

7 Claims, 9 Drawing Figures

ELECTRONIC SCALE WITH COUNTERBALANCE

BACKGROUND OF THE INVENTION

This invention relates generally to measuring apparatus and more particularly to a weighing scale.

Various scales are commercially available for providing a digital or other indication of the weight of a body placed on a weighing pan. Many of the recently developed scales make use of electronic circuitry including integrated circuits and microcomputer controls for perfecting various scale operations such as weighing, counting, altering resolution, converting units, etc. In this regard, these devices comprise electronic circuitry usually including a movable transducer and mechanical interfacing means between the electronic circuitry and the weighing pan. To that end, notwithstanding the high levels of sensitivity and accuracy associated with the electronic circuitry, the overall accuracy of the scale for small weights nonetheless depends largely upon the ability of the mechanical means to avoid introducing vibrational error into the weighing process.

With regard to the prior art, scales have tended to be one of several types. One type of scale, often referred to as a balance, is constructed so that the object being weighed on the scale's weighing pan applies a downward force to the free end of a lever arm. The lever arm is arranged to pivot about a fulcrum, so that the weight of the object on the weighing pan can readily be determined in terms of how much weight or force must be applied to the opposing end of the lever arm to exactly balance or offset the load on the weighing pan. Although these types of scales tend to be fairly accurate and are generally suitable for their intended purposes, they also tend to be somewhat slow in operation (e.g., by requiring the person operating the scale to move calibrated weights along the lever arm to achieve an exact balance) and are not easily adapted for being used in combination with electronic measuring or indicator means.

Other prior art scales, of either mechanical or electronic construction have typically included spring means and a movable arm arranged to pivot about a fulcrum, wherein the object being weighed applies a generally downward force against the free end of the arm, with the spring means serving to upwardly bias or resist any downward movement of the free end. Mechanical or electrical sensing means, responsive to the lever arm's displacement are typically used to measure and indicate the weight of the object on the weighing pan. Although these scales are also generally suitable for their intended purposes, one major drawback associated with such scales is that their weighing accuracy especially for small weights, is often adversely affected by vibration in the scale's environment, i.e., vibration transmitted through the supporting structure upon which the scale is resting, to the scale. In that regard, vibration, particularly in the up/down direction, is readily transmitted to the scale so as to cause the scale's pivot arm to initially be displaced in either an upward or downward direction, followed by gradually attenuating up/down oscillations of the arm. Although these oscillations may be small in amplitude, the amount of error introduced into the weighing process as a result thereof is often sufficiently great to produce substantial weighing inaccuracies, particularly where light weight objects are being weighed.

Moreover, other types of prior art scales which do not utilize a pivot arm, but which use spring or other means to bias a platform upward against the downward force of a load being weighed, are also subject to weighing inaccuracies attributable to vibration of the type described above.

OBJECTS OF THE INVENTION

Accordingly it is a general object of the instant invention to provide an improved and highly sensitive and accurate weighing scale.

It is another object of the invention to provide an electronic weighing scale which includes counterbalancing means to minimize weighing inaccuracies attributible to vibration transmitted to the scale from its surrounding environment.

It is a further object of the invention to provide a weighing scale which also includes dampening means arranged to further minimize weighing inaccuracies attributable to vibration.

It is still a further object of the invention to provide counterbalancing means adapted for use in combination with a flexure base weighing scale to improve upon the scale's weighing accuracy.

SUMMARY OF THE INVENTION

These and other objects of the instant invention are readily achieved by providing a scale which can be used to weigh and to measure other parameters of an unknown material or object. The scale includes support means, platform means arranged to move upon receipt of some material thereon, force sensing means coupled to the platform means, said force sensing means including force resisting means coupled both to the support means and the platform means to resist downward movement of the platform means. The scale further includes rotational means having a first portion which is coupled to the platform means, a second portion and a rotational axis interposed between the first and second portions. Thus, the rotational means pivots about the rotational axis when the material is placed on the platform means. The scale also includes counterbalancing means connected to the second portion of the rotational means. The counterbalancing means is of a predetermined weight so as to apply an amount of torque to said second portion approximately equal to the amount of torque applied to the first portion of the rotational means when the material is not on the platform means. The counterbalancing means serves to approximately balance and establish an equilibrium state for the rotational means along said rotational axis, thus minimizing the vertical movement of the platform means when vibration is transmitted to the support means from external sources.

Furthermore, an alternative embodiment of the invention includes a flexure base scale adapted to include counterbalancing means.

DESCRIPTION OF THE DRAWING

Other objects and many of the attendant advantages of the invention are readily appreciated as the same becomes better understood by reference to the following detailed description when considered in connection with the accompanying drawing wherein.

DETAILED DESCRIPTION OF PREFERRED EMBODIMENT

Figure 1:
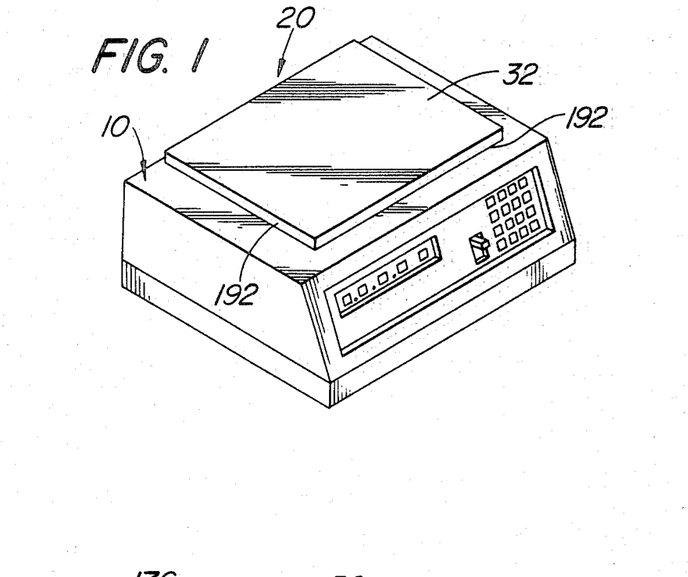
FIG. 1 is a perspective view of an electronic scale constructed in accordance with the instant invention.

Referring now to the various figures of the drawing wherein like reference characters refer to like parts, there is shown at 20 in FIG. 1 an electronic scale constructed in accordance with the teachings of the instant invention.

Although the device 20 is referred to as a "scale" throughout this patent application, it should be understood that the instant invention is not limited to that of a "weighing" device but can also be used for determining the mass, density, volume and other parameters of a liquid or solid, whenever weight can be used as a factor in making such a determination. In this regard, the utilization of the scale 20 for purposes other than "weighing" is shown and described in my U.S. Pat. No. 4,372,405, which issued on Feb. 8, 1983, and whose disclosure is hereby incorporated by reference, herein.

Figure 7:
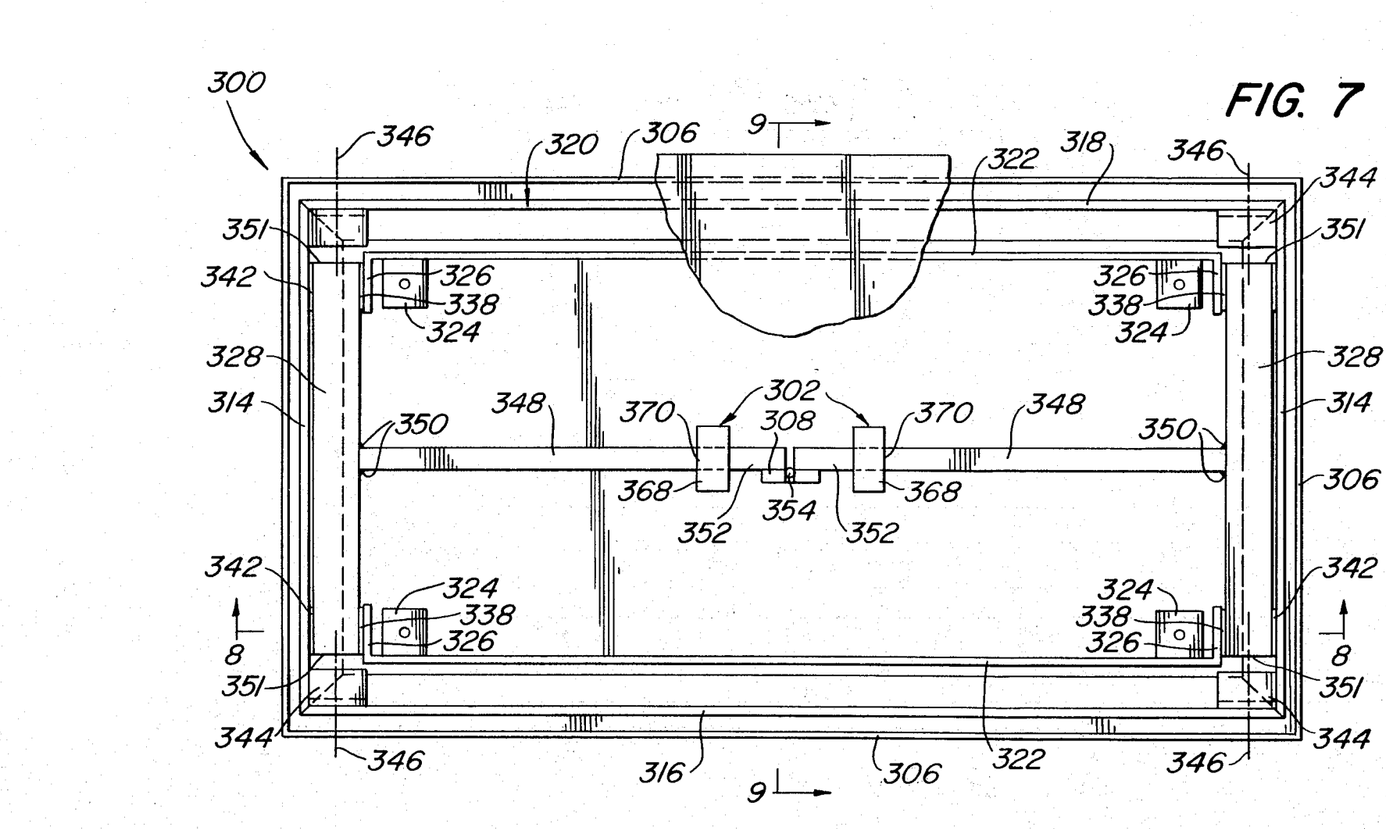
FIG. 7 is a plan view, partially broken away, of a portion of a flexure base scale adapted to include and utilize counterbalancing means in accordance with the teachings of the instant invention.
Figure 8:
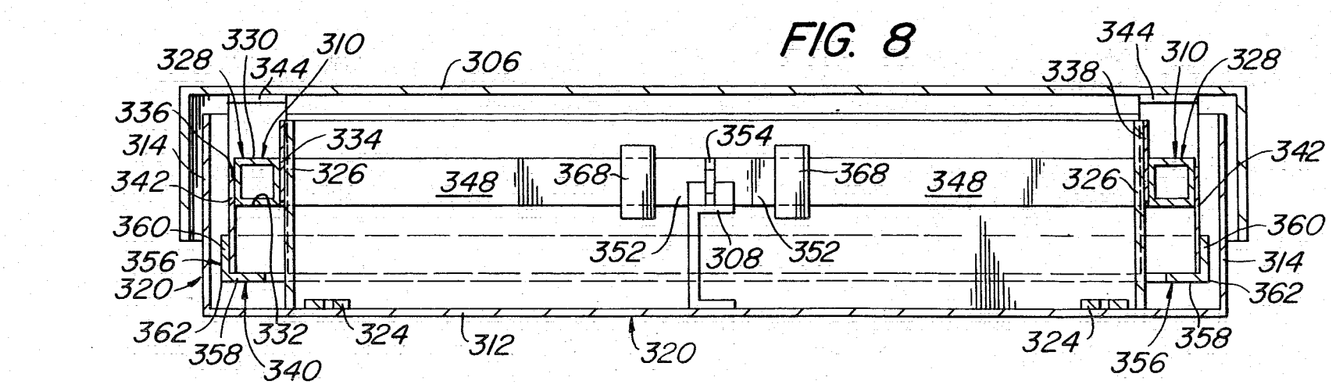
FIG. 8 is a sectional view taken along line 8—8 of FIG. 7.
Figure 9:
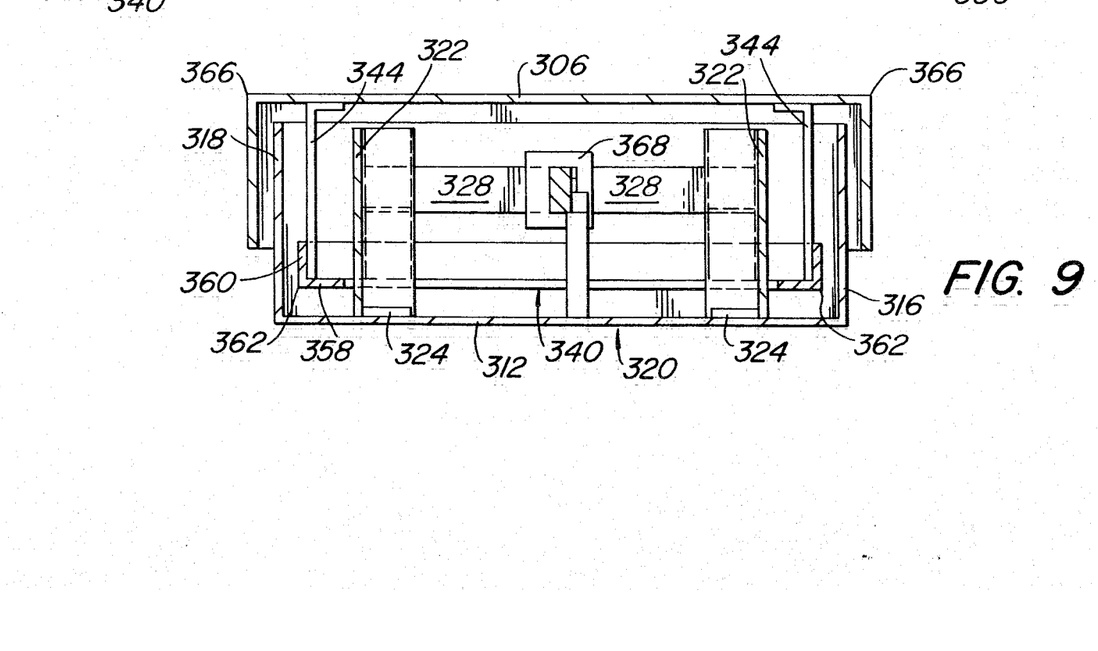
FIG. 9 is a sectional view taken along line 9—9 of FIG. 7.

It should also be pointed out at this juncture that the instant invention relates not to the scale's electronic circuitry, which is conventional, but to an improved mechanical construction. More specifically, the instant invention relates to the use of counterbalancing means for achieving greater measuring accuracy by eliminating, or at the very least minimizing, the adverse effects of vibration. The preferred embodiment scale, as shown in FIGS. 1-6, comprises a spring biased capacitive weighing scale which includes the counterbalancing means of the instant invention, while an alternative embodiment of the invention, as shown in FIGS. 7-9, comprises a flexure base scale (to be described later), also adapted to include counterbalancing means. It should further be pointed out that the instant invention relates to mechanical scales as well as electronic scales. With the foregoing in mind, it should be pointed out that regardless of which type of scale is being used, the counterbalancing means serves to counteract or offset inaccuracies in the weighing process attributable to vertical acceleration of the moving components of the scale caused by vibration transmitted to the scale from external sources, e.g., vibration transmitted to the scale from the supporting surface upon which the scale is resting. In addition, the preferred embodiment of the invention also includes energy absorbing dampening means (to be described later) which further serves to reduce the undesirable effects of vibration.

Now describing the preferred embodiment of the invention, the scale 20 is a self-contained, solid state device, which is readily used for measuring the weight or other parameters of an unknown liquid or solid and for providing a digital reading thereof. The scale 20 basically comprises a frame assembly 24 (FIG. 3) for supporting various mechanical and electrical components within the scale's casing 10, a suspension system 28 mounted on the frame assembly and supporting the platform or pan 32 (FIG. 1), counterbalancing means 34 (FIG. 3) and displacement responsive transducer means 36, coupled to the suspension system and thus to the pan.

The details of the frame assembly 24 and the suspension system 28 will be described later, but suffice if for now to state that the suspension system 28 basically comprises upper and lower parallelogram members 40 and 44 respectively, and an interconnecting vertical column 48. An arm 52 extends horizontally from the top of the column 48 just above the upper parallelogram 40. A tubular column 56 is mounted on the arm and terminates at its upper end in a spider 60, upon which the pan 32 is mounted.

The transducer means 36 will be described in detail later, but basically comprises a variable capacitor including an upper plate 64 and a lower plate 68. The lower plate is arranged to be displaced either upward and downward with respect to the upper plate when the pan is loaded or unloaded, as the case may be. The upper plate is fixedly connected to the frame assembly 24, via upper plate support means 70, while the lower plate is mounted on the frame assembly by lower plate support means 71 and spring means 72. The lower plate 68 is also coupled to the pan 32 by the column 56, the arm 52, the column 48 and other elements of the suspension system 28, to be described later.

The counterbalancing means 34 which shall also be described in detail later, basically comprises a counterweight or bar 74 (FIG. 3) which is attached to the rear end of the lower plate support means 71 (i.e., the end opposite where the lower plate support means is connected to the lower capacitor plate 68).

The spring means 72 comprises a rod which is arranged to twist in order to permit displacement of the lower plate 68 relative to the upper plate 64. In this regard, the lower plate pivots about the central axis 272 of the spring means 72 so that its displacement relative to the upper plate is in a rotational as opposed to a translational direction, as shall be described in greater detail later. Furthermore, and as shall also be described in greater detail later, the spring means 72 is connected to the lower plate support means 71, intermediate the counterweight 74 and the lower capacitor plate 68, such that the center of gravity for the support means 71, the lower capacitor plate 68 and the counterweight 74 is disposed approximately along the central axis 272 (FIGS. 3 and 5) of the spring means 72, when there is no material or load on the platform 32. This balanced state ensures that vertical movement or vibration of the frame 24 does not readily result in the lower plate support means oscillating or moving in a vertical direction to cause a displacement in the lower capacitor plate. Weighing inaccuracies attributable to vibration as such are thus, substantially if not entirely, eliminated. The specific construction of the counterbalancing means 34 as used in the preferred embodiment and in the alternative embodiment of the invention, respectively, shall be described later.

The use of parallelogram members 40 and 44 in a scale suspension system is a conventional technique to insure that only the vertical component of the load is transferred to the pan's displacement detecting means. In the case of this invention, the parallelogram members 40 and 44 and associated components of the suspension system perform that same function. Therefore, only the vertical component of the load on the pan is transmitted to the lower capacitor plate 68 by the suspension system. Moreover, the suspension system counteracts all side load and twisting moments (which might be applied to the pan) and rigidly resists all motions except for up/down movement.

The plates 64 and 68 of the capacitor 36 are connected by electrical conductors (not shown) to the input of a variable frequency oscillator. The oscillator produces an electrical signal whose output frequency is a function of the capacitance of the capacitor 36 and hence, a function of the vertical displacement of the weighing pan 32. The electrical signal from the variable frequency oscillator is acted upon by the electronic circuitry of the device 20 to provide a reading of weight, volume or density of the material placed on the pan. In this regard, the electrical circuitry of the apparatus is not generally shown or described in this application but is set forth in greater detail in my above identified prior application.

Figure 2:
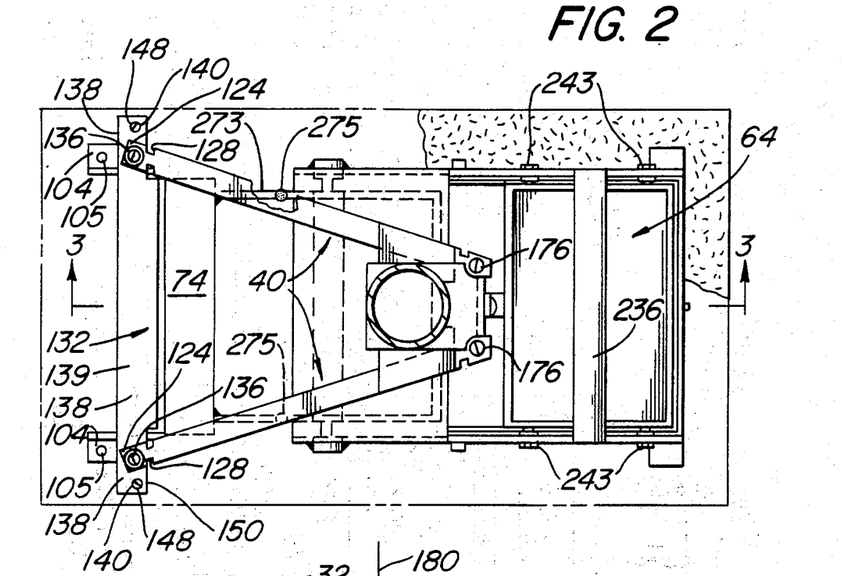
FIG. 2 is a top plan view of the electronic scale shown in FIG. 1 with the casing and platform removed.

Referring now to the various Figs. of the drawing, the details of the suspension system 28, the frame assembly 24, the capacitor 36, and the mounting means for the capacitor will be described in detail. Thus, as seen in FIGS. 2, 3 and 4 the frame assembly 24 is generally rectangularly shaped and is made up of plural bar-like frame elements, namely a pair of side frame elements 76 (FIG. 4), an end frame element 80 (FIG. 3), a primary cross-frame element 84 (FIG. 3), a secondary cross-frame element 88 (FIG. 3) and the upper plate support means 70 (FIG. 3), as will be described later.

Figures 3, 6:
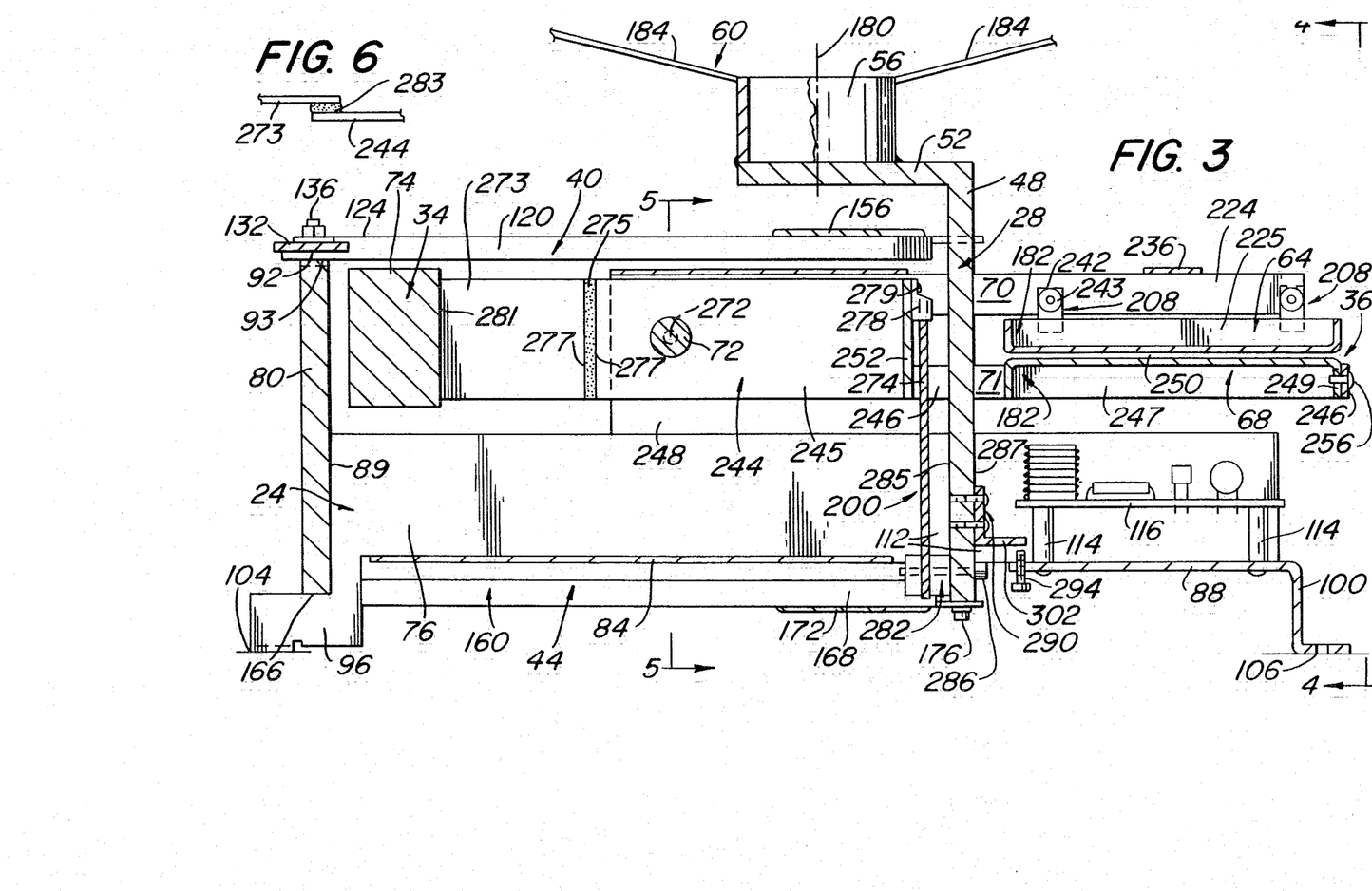
FIG. 3 is an enlarged sectional view taken along line 3—3 of FIG. 2.
FIG. 6 is a plan view of alternative energy absorbing connecting means for joining the lower plate support bracket to the counterbalancing means of the scale shown in FIG. 1.
Figure 4:
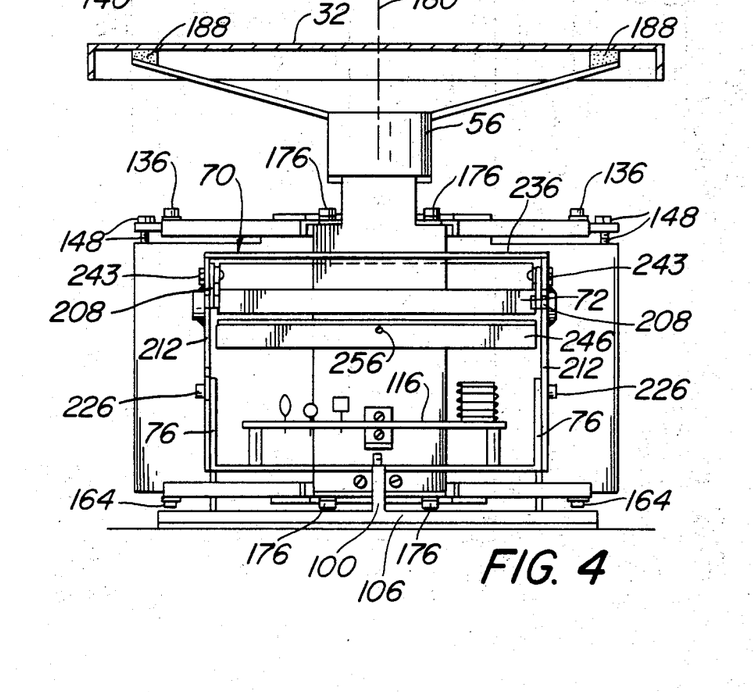
FIG. 4 is a reduced sectional view taken along line 4—4 of FIG. 3.
Figure 5:
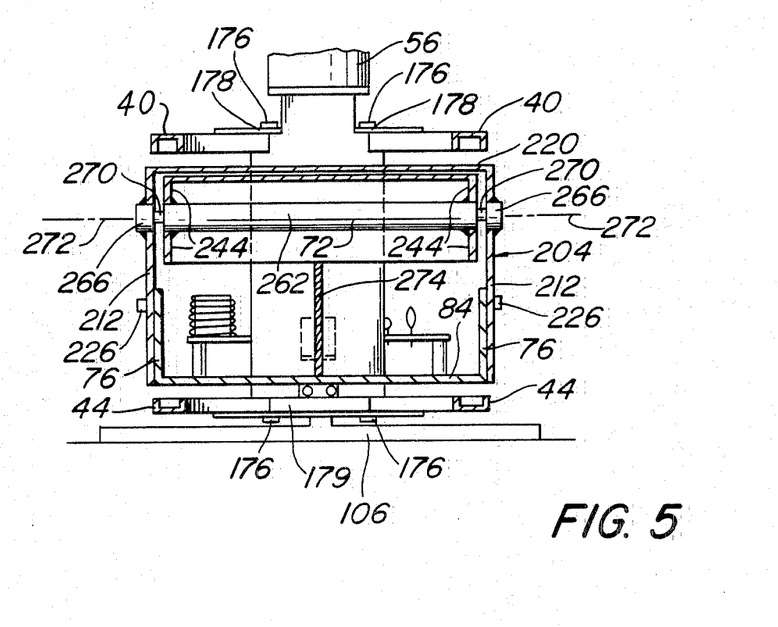
FIG. 5 is a reduced sectional view, partially broken away, taken along line 5—5 of FIG. 3.

Referring to FIG. 3, the side frame elements 76 are attached (e.g., welded) at right angles to the end frame element 80. The respective connections are made along vertically disposed joints 89 on the front planar surface of the end frame element. The end frame element 80 is also connected by similar means to the cross-frame element 84 along a joint 90. The connections between the end frame element and the side frame elements and cross-frame element insure that the side frame elements are rigid with respect to the end frame element in the up/down direction.

The end frame element 80 includes a spacer bar 92 fixedly secured at its mid-portion along the top edge 93, of the element 80. The spacer bar 92 operates in combination with a flexible adjustment bar (to be described later) to enable adjustment of the upper parallelogram assembly 40.

The primary cross-frame element 84 and the secondary cross-frame element 88, each comprises a generally rectangular, planar bar, which interconnects the bottom edges of the respective side frame elements 76. The primary cross-frame element 88 is connected to the respective side frame elements adjacent the rear portion of the scale (e.g., beneath the upper parallelogram assembly 40) and the secondary cross-frame element 88 is connected to the side frame elements adjacent the front portion of the scale (e.g. generally beneath the variable capacitor 36). Furthermore, there is a space between the respective cross-frame members, as shall be described later.

The device 20 is supported by a set of legs arranged in a tripod configuration. The set of legs includes a pair of rear legs 96 and a front leg 100. Each rear leg 96 extends vertically from and is formed integrally with, a respective side frame element 76. Each leg also includes a generally horizontal foot 104, having a mounting hole 105 (FIG. 2), which is used for bolting the scale 20 to a horizontal supporting surface (e.g., a cabinet).

The front leg 100 is formed integrally with the secondary cross-frame element 88 at a position midway between the respective side frame elements 76. The front leg 100 extends vertically downward and includes a generally horizontal foot 106 having a mounting hole (not shown) which is also used for mounting the scale 20 on a horizontal surface.

The suspension components are mounted on the frame assembly 24 and are located within a space between the end frame element 80 and the capacitor 36, with the upper parallelogram member 40 being located generally above the side frame elements 76, and the lower parallelogram member 44 being located generally below the side frame elements. The area between the primary and secondary cross-frame elements 76 and denoted by the reference numeral 112, defines a space in which the interconnecting vertical column 48 is located.

The electrical components of the oscillator are located on a circuit board 116 which is mounted by standoffs 114 on the secondary cross-frame element 88 and between the respective side frame elements 76. The electrical components shown on the circuit board 116 are merely exemplary of the actual components used.

The upper and lower plates 64 and 68 of the capacitor are supported by the upper plate support means 70 and the lower plate support means 71, respectively, so as to locate the capacitor generally above the circuit board 116 and between the side frame elements 76.

The upper parallelogram member 40 comprises a pair of elongated legs 120, each of which is of U-shaped cross-section, except for its opposed end portions 124 (FIG. 2), which are planar. A pair of notches 128 are located in the opposed edges of the planar portions 124 to serve as flex points for the legs of the parallelogram.

In order to permit adjustment of the vertical angle of the legs of the upper parallelogram, a flexible adjustment bar 132 is interposed between the planar end portions 124 of the upper parallelogram and the end frame element 80. The adjustment bar mounts the upper parallelogram and is constructed as a generally planar member which is flexible in the up/down direction and rigid in all other directions. Moreover, the adjustment bar 132 is upwardly biased at its respective ends 138. Thus, as can be seen in FIG. 2 the mid-portion 139 of the adjustment bar is attached (e.g., welded) to the top edge of the spacer bar 92 along the entire length of the spacer bar. The adjustment bar also includes a respective mounting hole 140 adjacent each of its ends, while the end frame element 80 includes a correspondingly located pair of internally threaded holes (not shown) along its top horizontal edge so as to permit respective bolts 148 to pass through the mounting holes 140 and engage the internally threaded holes of the end frame element. Since the intermediate portion 139 of the adjustment bar is welded to the spacer bar and its respective ends are bolted to the end frame element as just described, the height of the respective ends is readily raised or lowered by tightening or loosening the adjustment bolts 148, as desired. As should be appreciated from the foregoing discussion, when the adjustment bolts 148 are loosened, the ends move upwardly under the upward bias force of the adjustment bar. Conversely, when the bolts are tightened, the ends of the bar are pulled downwardly toward the top edge of the end frame element 80, against the bias of the adjustment bar.

Each leg of the upper parallelogram is connected to the top surface of the adjustment bar 132 via respective bolts 136. In addition, the adjustment bar includes a pair of recesses 150 adjacent its respective ends to accommodate the downwardly directed portions of the U-shaped parallelogram legs. Since the legs 40 of the upper parallelogram are attached to the adjustment bar 132 adjacent the respective ends of said bar, the height of the ends and thus the vertical angle of the respective legs are readily adjusted by tightening or loosening the respective adjustment bolts as just described.

As can be seen in FIG. 2, the legs of the parallelogram 40 extend at an acute angle to each other, with the free ends of the legs being located in space 112. The free ends of the parallelogram legs are interconnected by means of a notched plate 156 (FIG. 3), which is attached to the top surface of the respective legs, adjacent the tubular column 56.

The lower parallelogram 44 is constructed in an identical manner to the upper parallelogram and includes a pair of legs 160 which are mounted at one end to the bottom horizontal edge 166 of the end frame element 80, via screws 164 (FIG. 4). The free end portions 168 of the legs of the lower parallelogram also terminate within the space 112 and directly below the free ends of the upper parallelogram legs. The free ends of the lower parallelogram legs include a notched plate 172 which is identically constructed and attached to the lower parallelogram legs as plate 156 is with regard to the upper parallelogram legs.

The interconnecting column 48 is a rigid, elongated, generally rectangular member which is mounted between the opposed free ends of the two parallelogram members, via respective bolts 176. The upper portion of the column 48 includes a pair of notched shoulders 178 (FIG. 5) to which the free ends of the upper parallelogram legs are bolted and a generally planar bottom edge 179 to which the free ends of the lower parallelogram legs are bolted.

The arm 52 is secured to the top of the interconnecting column 48 (i.e., above the shoulders 178) and as noted heretofore, extends parallel to the parallelogram legs. Moreover, the free end of the arm 52 is located approximately central with respect to the space 112. The tubular column 56 is mounted on the free end of the interconnecting arm 52, with the longitudinal axis of the column, denoted by the broken line 180, defining the center line for the apparatus pan 32.

The spider 60 includes four angularly extending arms 184 (only two of which are shown). Each arm terminates at its free end in a vibration-dampening cushion 188 (FIG. 4). The pan 32 is a generally planar member of rectangular shape and having a downwardly projecting flanged peripheral edge 192. The pan is arranged to be disposed on the vibration-dampening cushions 188 of the spider for support thereon.

As will be appreciated from the foregoing, when a body or load is placed on the pan, irrespective of its position on the pan, only the vertical component of the load is applied to the free end of the arm 52 along axis 180 (FIG. 4).

In an alternative embodiment of the scale 20, a flat metal plate (not shown) is used in place of the spider 60 in order to simplify the scale's construction.

The details of the suspension system 28, the capacitor 36, the upper plate support means 70 and the lower plate support means 71 will now be described. The upper plate 64 of the capacitor 36, like the lower plate 68, is a generally planar metallic member, of generally rectangular shape. Each plate includes a flanged portion 182 around its periphery which is connected to respective plate support means 70 or 71 and to associated electrical conductors (not shown). Thus, the upper plate 64 is fixedly mounted to the frame 24 by the upper plate support means 70, while the lower plate 68 is pivotably connected to the frame assembly 24 by the lower plate support means 71 and the spring means 72. Furthermore, the lower plate is also coupled to the pan 32 via the vertical column 48, the suspension system 28 and a cable assembly 200.

The spring means 72 serves to bias the lower plate 64 upwardly towards the upper plate 64 to a neutral or null position against the downward urging of the suspension system and cable assembly when a load is placed on the pan. As will be described hereinafter, the greater the weight of the load on the pan the further the lower plate is displaced downward relative to the upper plate. This action thus increases the air gap between the capacitor plates, thereby decreasing the capacitance of the capacitor 36. The changed capacitance is sensed by the electronic circuitry to provide an indication of the weight of the object on the scale's pan.

The upper plate support means 70 comprises an upper frame assembly 204 (FIG. 5) and a plurality of strap members 208 (FIG. 3). The upper frame assembly 204 is a very rigid one piece unit comprising a pair of vertical side walls 212, a bridging top wall 220 and a pair of arms 224 (FIG. 3), each projecting forward from an associated side wall 212. The side walls 212 are each connected to a respective side frame element 76 by mounting screws 226. The upper frame assembly 204 when mounted as just described is located between the upper and lowr parallelogram assemblies, with each arm 224 extending from its respective side wall 212 in a generally co-planar, horizontal direction and disposed generally above the side edges of the secondary cross-frame element 88. A cross-bar 236 interconnects the respective arms 224 at an intermediate location to insure that the arms remain parallel and rigid with respect to each other.

The strap members 208 are thin strips which serve to suspend the upper capacitor plate from the arms 224. In this regard, each strap is bolted at one end to a respective arm 224 and is adhesively secured at its opposite end to an insulator (not shown) which is adhesively secured to a lateral side portion 225 of the flange of the upper capacitor plate. In the preferred embodiment of the invention, four such straps are used, with two straps being attached to each side portion 225 and arranged so that there is a strap situated adjacent each of the four respective corners of the upper plate.

Referring to FIG. 3, each strap is a very thin, planar and generally rectangular member having a U-shaped slot 242 adjacent its upper end. Each slot serves as a mounting opening for securing the strap onto the end being connected to the upper frame assembly arm 224 via an associated bolt 243. The U-shaped slot permits adjustment of the position or angle of the upper plate by varying the position of the straps relative to the arm 224. Thus, the gap 250 between the upper and lower plates can readily be adjusted or calibrated by loosening the mounting bolts, accurately positioning the capacitor plate and then tightening the bolts.

Referring to FIG. 3, the lower plate support means 71 is pivotably mounted on the frame by the spring means 72 and basically comprises a generally rectangular support bracket 244 as shall be described in greater detail later, the support bracket 244 also serves as mounting means for the counterbalancing means 34. The support bracket 244 is constructed of a relatively thick walled base portion 245 and a pair of projecting arms 246. The thick base portion 245 is very rigid, particularly in the up/down direction so as to minimize the effects of non-torsional stresses and strains which may be encountered. The base portion comprises a pair of parallel side walls 248 which are disposed generally parallel to and adjacent (but free of contact with) the side walls of the upper plate supporting bracket 70. The side walls are interconnected by means of a thick vertical front wall 252 which is disposed generally parallel and adjacent the vertical column 48.

The arms are each thin elongated planar strips extending horizontally in a vertical plane from the sidewalls of the base 244. Thus each arm is rigid in an up/down direction, but flexible in all other directions. Each arm is attached (e.g., welded) to the outer surfaces of the respective side walls 245 of the base portion 248. The outermost end of the arms are joined by a bridging strip integrally formed with the arm to form a projection having a generally "U"-shaped configuration. This "U"-shaped projection is configured to encircle the periphery of the lower capacitor plate 68 to serve as the mounting means therefore. Thus, respective portions of the strap are parallel to the respective side flange portions 247 and front flange portion 249 of the lower plate and are attached thereto by a set of three mounting screws 256. Each of the three mounting screws connects a portion of the strap to the left side, right side, and front flange, respectively, of the lower capacitor plate.

As mentioned earlier the support bracket 244 (FIG. 5) is mounted on the upper frame assembly 204 by the spring means 72. The spring means 72 basically comprises an elongated cylindrical member or bar formed of a strong, yet resilient metal, (e.g., stainless steel), and having a pair of reduced diameter neck sections 270, each adjacent a respective end 266 of the bar. Each end 266 of the bar is fixedly secured to a respective sidewall 212 of the upper frame assembly. The reduced diameter neck portions 270 are of substantially smaller cross-section than the remainder of the bar and thus serve as the actual spring means of the device since they serve as the twist situs when a torque is applied to the intermediate portion 262 of the bar relative to the end portions thereof. In this regard, each neck portion is of relatively short length (e.g., approximately 2½ times its diameter) to minimize any bending which might occur along these portions. However, as a practical consideration the shortness of these portions is limited by the fact that the shorter the length, the greater is the twist per unit of length and stress.

The securement of each end of the bar 72 is as follows: the outer portions 266 of the bar 72 extend through respective holes in the side wall 212 of the upper frame assembly and are welded in place. The sidewalls 244 of the lower capacitor support bracket are also fixedly secured to the bar 72. To that end, portions of the intermediate portion 262 of the bar 72 contiguous with each neck portion extend through an associated bore in an associated side wall 244 of the lower capacitor support bracket and are fixedly attached, (e.g., welded) thereto.

As a result of the foregoing arrangement, it should be appreciated that inasmuch as the reduced thickness (cross section) portions 270 are of lesser cross-section than the other portions of the bar 72, when a force is applied to the lower capacitor plate mounting bracket 244 as a result of weight being added to the pan 32, the reduced thickness portion 270 of the bar 72 rotates or twists evenly about the longitudinal central axis 272 of the bar. Thus, when weight is added to the pan 32 the intermediate portion 262 of the bar rotates relative to the end portions 266 of the bar and the upper frame assembly 204. This rotation causes the support arm 246 and lower capacitor plate 68 to move in a generally downward direction and the counterbalancing means 34 to move in a generally upward direction.

It should further be appreciated that when weight is removed from the pan, the biasing tension of the bar 72 causes the bar to twist in the opposite direction (e.g., toward an untwisted position or state). This results in the supporting arms 68 and lower capacitor plate 68 both moving in a generally upward direction and the counterbalancing means 34 moving in a generally downward direction. Thus the lower plate pivots towards the upper plate to produce a corresponding change in capacitance, to indicate a reduced amount of weight on the pan 32.

It should still further be appreciated that in a commercial embodiment of the device 20, its electronic circuitry is calibrated so that when the spring 72 is at equilibrium under the weight of an empty weighing pan 32, the display means indicates a weight of zero. Furthermore, in its preferred embodiment, the scale 20 is constructed so that even when there is no load on the pan 32, there will still remain a gap 250 between the respective capacitor plates 64 and 68.

The counterbalancing means 34 serves to minimize weighing inaccuracies attributable to vibrational movements of the scale 20 in an up/down direction. As mentioned above, vibrational movements as such are a common problem associated with most types of electronic scales, but is particularly severe in situations where the scale's supporting structure, e.g., cabinet, is resting on a wooden or other non-rigid support, e.g., floor, surface.

With this background in mind, it should readily be appreciated that the counterbalancing means serves to minimize the foregoing problem by offsetting or counterbalancing the torque or gravitational forces applied to the forward portion of the bracket 244 (i.e., the portion located between the central axis 272 of the spring and the front of the scale) by the various components of the scale, including the bracket itself, when no weight is on the weighing pan 32. By the use of the counterbalancing means 34, the bracket assembly's center of gravity is disposed along a vertical plane passing through the rotational axis 272 of the spring 72. Thus, when no weight is on the weighing pan, vibration or vertical acceleration of the scale's frame assembly 24, in either an up or down direction, does not readily produce up/down movement of the bracket means 71. Furthermore, since for small weights the amount of weight on the weighing pan is small in comparison to the weight of the bracket means and the various other scale components connected thereto, the center of gravity for the bracket means 71 for all intents and purposes remains substantially at the rotational axis 272.

Referring to FIG. 3, the counterbalancing means 34 basically comprises the counterweight 74, a pair of counterbalance support arms 273 and energy absorbing connecting means 275. Each support arm 273 is of the same profile as and is co-planar with a respective sidewall 244 of the lower capacitor supporting bracket and is joined to said sidewall 244 by the connecting means 275. The connecting means 275, which shall be described in greater detail later, basically comprises a pair of vertically extending columns of an energy absorbing material (e.g., closed cell foam), and is located intermediate the spring means 72 and the counterweight 74. In this regard, the connecting means is joined at opposing vertically extending sides 277 to the arms 273 and sidewalls 244, respectively, by conventional means (e.g., an adhesive). Furthermore, the free ends 281 of the respective arms 273 are connected (e.g., welded) to the counterweight so as to dispose the counterweight at right angles to the two arms.

The counterweight 74 is in the form of a thickened rectangular bar which is located adjacent and generally parallel with the end frame element 80. The counterweight can be constructed of a variety of different materials, although in the preferred embodiment of the scale 20 it is constructed of steel and is of an appropriate dimension and weight to offset the amount of torque applied to the forward portion of the lower capacitor supporting bracket by the various components of the scale, when no weight is on the weighing pan.

It should be pointed out at this juncture that even though it is not shown in the drawing herein, calibrating means can be incorporated in the scale 20 for increasing or decreasing the torque applied by the counterbalancing means. Such a feature enables the support arm 71 to be precisely balanced. Such calibrating means can consist of a conventional adjustable screw extending from the weight.

Irrespective of whether or not calibrating means are utilized the vertical position of the counterweight 74 is such that the center of gravity for the counterweight, the support bracket, the projecting arms and the lower capacitor plate, is located in the same horizontal plane as the spring's axis 272. This arrangement further ensures that vibration encountered by the scale does not cause a twisting moment around the axis of rotation 272 caused by horizontal vibration.

As mentioned above, the connecting means 275 comprises a vertically extending, energy absorbing column, which is attached to and thus, serves to connect the respective arms 273 of the counterbalancing means to the lower capacitor support means 244. Thus, the energy absorbing material of the connecting means permits the counterweight support arms and the counterweight to move or oscillate in an up/down direction, so as to still further dampen or reduce the amount of vibration which is transmitted to the lower capacitor plate supporting bracket. It should further be mentioned that the connecting means 275 may be located anywhere between the counterweight 74 and the spring means 72. In this regard, in one alternative embodiment of the device 20 (not shown), the connecting means is joined directly to the counterweight 74, thus serving as the counterweight support arms 273 and eliminating the need for other means (e.g., a welded joint) to mount the counterweight 74 on the counterweight support arms 273.

In FIG. 6, there is shown lap joint connecting means 283. The lap joint connecting means 283 serves as alternative means for connecting the projecting arms 273 to the sidewalls 244 of the lower capacitor support arms. To that end, in this alternative embodiment of the scale 20, the respective arms 273 are disposed parallel to the respective sidewalls 244 and are arranged to overlap portions thereof. The connecting means 283 are interposed between the overlapping portions and are attached thereto (e.g., by adhesive means), to join the counterbalance support arms 273 to the sidewalls 244. The lap joint connecting means 283 (FIG. 6) is constructed of the same materials as the connecting means 275 of the preferred embodiment and functions in essentially the same manner i.e., to further reduce or dampen the amount of vibration transmitted to the lower capacitor plate support bracket.

The cable assembly 200 serves as means for coupling the lower plate support means 71 to the vertical column 48 and hence to the pan 32. As best shown in FIG. 3, the cable assembly 200 basically comprises a metal, non-stretchable cable 274, an upper clamp assembly 278 and a lower clamp assembly 282. The upper clamp assembly 278 is threadedly attached by a screw 279 to the front surface of the front wall 252 of the lower plate support means 71 at a central position with respect thereto. The cable 274 is fixedly secured to the upper clamp assembly 278 in a conventional fashion. The lower end of the cable is secured by the lower clamp assembly 282 to the lower portion of the vertical column 42. In this regard, the lower clamp assembly 282 is attached to the vertical column 48 at a central position with respect to the column 48. The lower clamp assembly 282 includes a central opening through which the lower end of the cable passes and is secured by two perpendicularly disposed screws 286. The screws engage the clamp assembly 282 to hold the cable in place and when the screws are loosened, one can vary the effective length of the cable to approximately set the gap between the two capacitor plates. However, the precise gap 250 between the plates, is adjusted as mentioned before, by loosening the bolts 243 and moving the straps 208.

As can be seen in FIG. 3, the lower clamp assembly 282 is constructed to situate the end of the cable to which it is connected, a predetermined horizontal distance from the rear planar surface 285 of the vertical column, to dispose the cable vertically within the space 112, between the front wall 252 and the vertical column 48.

In view of the foregoing discussion and description, it should readily be appreciated that movement of the vertical column 48 in a downward direction pulls the cable 274 in a downward direction. Since the cable 274 is connected to the front plate 252 of the lower capacitor mounting bracket 244, downward movement of the cable pulls downwardly on the front plate 252 of the lower capacitor mounting bracket, causing the reduced thickness portions 270 of the spring 72 to twist and the mounting bracket to pivot downwardly about the central axis 272 of the spring. The downward rotation of the mounting bracket causes the planar surface of the lower capacitor plate to move in a generally downward direction, thus increasng the gap 244 between the upper and lower plates.

Conversely, movement of the vertical column 48 in an upward direction reduces the tension on the cable 274, enabling the bar 72 to untwist (e.g., move towards an untwisted equilibrium state), resulting in the lower capacitor mounting bracket 244 pivoting upwardly. Upward pivoting of the bracket 244 causes the lower plate 68 to move upwardly so as to reduce the size of the gap 244 between the respective plates 64 and 68.

In order to prevent overtravel of the lower capacitor plate downward, the vertical column 48 further includes a stop member 290 (FIG. 3) which coacts with a set screw 294 to limit the downward vertical movement of the colunn. The stop member 290 comprises an "L"-shaped bracket which is bolted to the front surface 287 of the vertical column at a slightly off-centered position. The free end of the set screw 294 is threaded through the secondary cross-plate 88 and extends a predetermined distance upwardly therefrom, to engage a horizontal leg 302 of the bracket 290 at the downward most position of the front plate.

As should be appreciated by those skilled in the art the maximum amount of weight which can be placed on the pan can be readily adjusted within predetermined limits by rotating the set screw 294 to either increase or decrease how far its free end extends above the secondary cross bar 88.

The electrical components as shown in the various Figs. of the drawing, are merely exemplary of components used in an actual embodiment of the device, are of conventional construction and arrangement and are more fully described in the disclosure of my above mentioned patent. Thus, the actual electronic components and circuitry need not be described in detail herein. Suffice it to state for now that the electrical components include variable frequency oscillator means which produces an electrical signal whose frequency corresponds to the electrical capacitance of the capacitor 36. This electrical signal is readily used for producing another signal indicative of the weight or other measurements relating to the object on the weighing pan 32. Additionally, the electrical components of the scale 20 include solid state memory or storage means and microprocessor means, including an algorithm compliment for effecting the various calculation and routines required. Thus, such storage means includes an algorithm which compensates for capacitance variations resulting from temperature changes which might occur.

An alternative embodiment scale 300 is shown in FIGS. 7, 8 and 9. In this regard, the scale 300 is a flexure base scale (i.e., a scale in which force applied to a weighing pan is transmitted to a lever arm through a flexure plate or crank), which is adapted to include and utilize counterbalancing means 302. The counterbalancing means 302 shall be described in detail later, but suffice for now to state that the counterbalancing means 302 functions in essentially the same manner as the counterbalancing means 34 of the scale 20.

Referring to FIG. 8, the flexure base scale 300 basically comprises a weighing pan or platform 306, force sensing means 308 and rotational means 310. The scale also includes a horizontally disposed rectangular base 312 from which a plurality of upwardly extending walls, to be described next, project. The upwardly extending walls include a pair of sidewalls 314, a front wall 316 (FIG. 9) and a rear wall 318 (FIG. 9). Each of the vertically disposed walls is joined (e.g., welded) to its immediately adjacent wall along vertically extending edges, and is further joined to the base portion 312 along horizontally disposed edges to form a frame structure or case 320. Projecting up from the base 312 are a pair of support brackets 322 (FIGS. 7-9). Each bracket is mounted on the base 312 of the case via a respective foot 324. As can be seen in FIG. 7, each bracket 322 is an elongated bar having a pair of flanged free ends 326. The ends 326 serve as the means for suspending a respective crank member 328 therefrom. Each crank is an elongated, hollow, rectangular member extending horizontally. Thus, each crank includes four peripheral surfaces, namely, a top surface 330, a bottom surface 332, an inner side surface 334 and an outer side surface 336.

Each crank is suspended from a respective flange 326 of the support bracket 322 via a flexible strap 338 secured to the innder side surface 334 of the crank and the flange 326, respectively. Each crank in turn serves to suspend a subplatform 340 therefrom via plural suspension straps 342. The subplatform 340 is a rectangular, open, frame-like structure which serves to support the pan 306 therefrom via plural support posts 344.

Each crank member 328 is adapted to rotate about its respective longitudinal axis 346 (FIG. 7) when a downward force is applied to its outer side surface. In this regard, it should be appreciated that the outer side surface 336 of the respective cranks are each coupled to the weighing pan 306 via the lower flex straps 342, the subplatform 340 and the support posts 344 and the inner side surfaces 334 of the respective cranks are each coupled to the scale's case 320 via the upper flex straps 338 and support brackets 322. Thus, when a load is placed on the weighing pan 306, a torque is applied to the crank members, causing the crank members to rotate about their respective longitudinal axes 346 in opposite rotational directions. Furthermore, the amount which the cranks rotate corresponds to the weight of the object on the weighing pan. Accordingly, by coupling the cranks to means responsive to the rotation, as shall be described later, the weight of the object on the weighing pan can be measured.

The scale 300 further includes a pair of lever arms or beams 348, which are coupled to the scale's force sensing means (to be described later). Each lever arm extends normally to an inner side surface 334 of a respective crank 328, at a weld joint 350 (FIG. 7) which is located mid-way between the opposing ends 351 of the respective cranks. Each of the two beams 348 is arranged to rotate in a common vertical plane with each other when weight is added to or removed from the weighing pan 306. Furthermore, the two beams 340 are disposed approximately colinearly with each other, when no load is on the weighing pan. It should further be pointed out that alternative embodiments of the scale 300 (not shown) could include three or more lever arms which operate in tandem.

Referring to FIG. 7, the respective beams are connected to each other at their respective free ends 352 by a hinge 354 which allows the ends to pivot with respect to each other as the cranks rotate. It is at the free ends 352 that the scale's force sensing means 308 is coupled to the lever arms.

The force sensing means 308 comprises a conventional type device (e.g., a strain gauge load cell), which measures the upward force applied by the pivoting free ends 352 relative to the scale's case 320, when an object is resting on the weighing pan. Such action is accomplished by the force sensing means 308 being coupled at one end to the arms 348 adjacent their respective free ends, and at another end, to a fixed support (not shown) mounted on the scale's case. Moreover, since the force sensing means 308 is of conventional construction and is used in a conventional manner in connection with the scale 300, it shall not be discussed in detail herein. Suffice it to state that the force sensing means produces a signal indicative of the amount of deflection or torque which occurs adjacent the free ends of the beams and converts that signal into another signal indicative of the weight of the object on the weighing pan. It should also be mentioned that alternative embodiments of the scale 300 can use various other conventional means for measuring the weight on the pan (e.g., by using displacement sensing means, torque sensing means, etc.).

The details of means for coupling the pan to the respective cranks shall now be described. To that end, the coupling means includes the subplatform 340 (FIG. 9), plural lower support straps 342 (FIG. 8) and plural support posts 344 (FIG. 9). The subplatform 340 is located generally beneath the respective crank members 328 and is formed of four elongated "L-shaped" members 356, each of which having a horizontal portion 358 and a vertical side portion 360. The members 356 are arranged in a rectangular "picture-frame" configuration and further include peripheral dimensions which are approximately equal to, although slightly less than, the peripheral dimension of the scale's case 320. As mentioned above, the subplatform 340 is suspended from the cranks 328 by four lower flex straps 342. The four flex straps are attached (e.g., bolted) to respective upwardly extending side portions 360 of the subplatform, with each strap being attached adjacent a respective corner 362 thereof. The opposite ends of the respective flex straps are attached (e.g., bolted) to the outer side surfaces 336 of respective crank members 328. More specifically, two of the straps 342 are connected to each crank member, adjacent respective ends thereof. Each strap is constructed as a flexible, planar, metal member, readily able to rotate or bend in a vertical plane, so as to permit the cranks to rotate when a load is placed on the weighing pan. Furthermore, the straps are generally rigid in all other directions so as not to stretch or rotate, other than as described above.

The weighing pan 306 is a horizontally disposed, planar member which is supported directly above the subplatform by means of four support posts 344 (FIG. 9). In this regard, each post 344 extends upward from the horizontal portion 358 of the subplatform and is arranged to support the underside surface 364 of the platform. To that end, each post is disposed and joined at one end to the horizontal portion 358 of the subplatform, adjacent respective corners thereof, and at its opposite end is joined to the underside 364 of the platform adjacent a respective one of its four corners 366.

Based on the foregoing description, it should be appreciated that when a load or object is placed on the platform 306, a downward force is applied to the subplatform 340, which in turn pulls downward on the outer side surfaces 336 of the respective cranks 338, thus causing the cranks to rotate about their longitudinal axes 346. The rotation of the cranks as such, causes the beams 348 to also rotate about those same axes, with their respective free ends 352 pivoting at the hinge 354 and thus, moving in a generally upward direction. The upward movement of the respective free ends is detected by the force sensing means 308, which as mentioned above, then produces a signal corresponding to the weight of the object on the weighing pan.

The counterbalancing means 302 basically comprises a pair of counterweights 368, which are mounted on respective beams 348, intermediate their adjoining cranks 328 and free ends 352. The counterweights 368, which in the preferred embodiment of scale 300, are constructed as metal bars of predetermined weight, serve to substantially balance the respective crank members along their respective rotational axes 346, when no weight or load is on the weighing platform. Each counterweight 368 is of rectangular shape and is secured to an arm 348 by conventional means, e.g., welding. Thus, for each crank, the amount of torque applied to its inner side surface 334 by its associated beam 348, and the counterweight 368 is approximately equal to the amount of torque applied to the outer side surface 336 of that beam by the weighing platform 306, the subplatform 340 and the other scale components which are coupled to those members, when no weight is on the weighing platform.

Alternatively, the weight of the beams themselves may be directly "adjusted" by selecting the appropriate metal thickness or section and/or providing lightening holes as required to achieve the correct counterbalance.

As is the case with the preferred embodiment invention 20, when objects placed on the weighing pan 306 are quite light in comparison to the weight of the respective beams, the platform, the subplatform and associated scale components, a balanced state is also approximately maintained even when objects are on the weighing pan.

As discussed in considerable detail above in connection with the preferred embodiment scale 20, by providing a balanced or equilibrium state along or adjacent the central axes of the rotational means, vibration and other up/down movement of the frame and scale assembly, attributable to vibration occurring in the scale's external environment, does not result in substantial vertical (up/down) displacement of the respective beams 348, so as to introduce error into the weighing process.

Moreover, the counterweights 368 comprise weighted members whose weight and distance from respective rotational axes 346 are such, so as to produce the balanced, equilibrium state described above. Therefor, the exact weight and distance the counterweights are from the respective axes of rotation are not independently critical, so long as the weight and distance are selected relative to each other, to apply the desired amount of torque to the inner side surfaces 334 of the respective cranks, to exactly offset the torque applied to the opposing outer side surfaces 336 of the cranks by the scale's platform, subplatform and other associated scale components. In the preferred embodiment of the scale 300, the respective counterweights 368 are located adjacent the free ends 352 of the respective beams, at equally spaced distances from their respective rotational axes 346. In alternative embodiments of the scale 300, other arrangements of the counterweights would also be satisfactory.

As will be appreciated from the foregoing, the instant invention in both its preferred embodiment 20 and in its alternative embodiment 300, provides effective means for measuring the weight of an unknown material or object with great accuracy and precision. The counterbalancing means, as used in either embodiment, serves to substantially reduce error or inaccuracy in the weighing process attributable to vibrational forces transmitted to the scale from its external environment.

Without further elaboration, the foregoing will so fully illustrate my invention that others may, by applying current or future knowledge readily adapt the same for use under various conditions of service.

I claim:
1. A flexure base scale comprising:

an outer frame structure including opposed, elongate side walls;

a platform means overlying the frame structure and adapted to move downwardly upon receipt of some material thereon;

a pair of spaced-apart, generally parallel elongate torsion members, each of said torsion members being adjacent a respective elongate side wall of the frame structure;

each torsion member having a first portion including an outer surface facing the elongated side wall to which it is adjacent, a second portion including an inner surface facing the inner surface of the other elongate member, and a rotational axis between said first and second portions;

coupling means for coupling the platform means to the first portion of each torsion member for applying a force on the first portion in the direction in which the platform means is adapted to move upon receipt of said material for imposing a torque on the torsion members in opposite rotational directions;

a lever arm coupled to the second portion of each of said torsion members, each lever arm extending laterally from its respective second portion in a direction toward the other lever arm for imposing a torque on each torsion member in a rotational direction opposed to the rotational direction of torque imposed on each torsion member by the coupling of the platform means to the first portion of each torsion member; and force sensing means coupled to the lever arms for measuring the force applied to the lever arms by sensing the movement of said lever arms in a direction opposite to the direction of movement of the platform means upon receipt of said material on said platform means.

2. The flexure base scale of claim 1 wherein each lever arm includes a free end, said arms being pivotably connected to each other at their respective free ends by arm coupling means, said arm coupling means also being connected to said force sensing means.

3. The flexure base scale of claim 1 including counterbalancing means connected to each of said lever arms for substantially balancing each torsion member about its respective axis of rotation when no material is on said platform means.

4. The flexure base scale of claim 2 including counterbalancing means connected to each of said lever arms for substantially balancing each torsion member about its respective axis of rotation when no material is on said platform means.

5. The scale of claim 4 wherein said counterbalancing means comprises a pair of weighted members, each connected to a respective lever arm.

6. The scale of claim 5 wherein said weighted members are coupled to respective lever arms adjacent their respective free ends.

7. The scale of claim 6, wherein said first and second torsion means comprise first and second crank members, respectively, said inner and outer surfaces being substantially parallel to each other, whereupon said lever arms are joined to the respective inner surfaces and said platform means is coupled to the respective outer surfaces, thus causing the respective inner surfaces to rotate in a generally upward direction when said material is placed on said platform means.

* * * * *